United States Patent

[11] 3,552,260

[72] Inventors Ernst J. Hunkeler
  Fairport;
  Charles E. Remmeli, Rochester; Robert A. Waasdorp, Fairport, N.Y.
[21] Appl. No. 764,218
[22] Filed Oct. 1, 1968
[45] Patented Jan. 5, 1971
[73] Assignee The Gleason Works
  Rochester, N.Y.
  a corporation of New York

[54] MEANS FOR BALANCING CRADLE OF GEAR CUTTING MACHINE
5 Claims, 15 Drawing Figs.

[52] U.S. Cl. .................................................. 90/1, 90/5, 74/573
[51] Int. Cl. ...................................................... B23f 23/00
[50] Field of Search ........................................ 90/1, 5, 6, 9.4, 11; 74/573; 241/292; 51/169

[56] References Cited
UNITED STATES PATENTS
82,278 9/1868 Benn .......................... 241/292
430,270 6/1890 Cook .......................... 74/573
2,492,066 12/1949 Schildmeier .................. 74/573
2,667,818 2/1954 Stewart et al. ................ 90/5

Primary Examiner—Gil Weidenfeld
Attorneys—Cushman, Darby and Cushman and Morton A. Polster ABSTRACT: An improved cradle is provided in a gear cutting machine so that bevel gears can be cut by a novel method which involves controlled axial movements of the cradle toward and away from a work spindle. In addition to providing conventional rotational movements to the cradle, there is provided a means for axially reciprocating the cradle in a timed relationship with rotations of a work spindle and with rolling movements of the cradle. The cradle includes a cylindrical surface which is journaled within a cradle housing, and novel means are disclosed for adjusting the balance of the cradle within its housing after it has been assembled in a gear cutting machine. The balancing means comprise a plurality of support members positioned within pockets spaced about the circumference of the cradle. Weight elements, adapted to be simply and detachably secured to the support members, are selectively placed on the support members to achieve cradle balance.

INVENTORS
ERNST J. HUNKELER,
CHARLES E. REMMELI &
ROBERT A. WAASDORP

BY Cushman, Darby & Cushman
ATTORNEYS

FIG. 2.

INVENTORS
ERNST J. HUNKELER,
CHARLES E. REMMELI &
ROBERT A. WAASDORP
BY Cushman, Darby & Cushman
ATTORNEYS

FIG. 3.

INVENTORS
ERNST J. HUNKELER,
CHARLES E. REMMELI &
ROBERT A. WAASDORP

FIG. 4.

FEED CONTROL MECHANISM

FIG.11.

PATENTED JAN 5 1971

INVENTORS
ERNST J. HUNKELER,
CHARLES E. REMMELL,
& ROBERT A. WAASDORP
BY Cushman Darby & Cushman
ATTORNEYS

MEANS FOR BALANCING CRADLE OF GEAR CUTTING MACHINE

BACKGROUND AND BRIEF DESCRIPTION OF INVENTION

This invention relates to gear cutting machines of the type which can cut bevel gears. In the context of this disclosure, it is intended that the terminology "bevel gears" generically include bevel gears having straight teeth, bevel gears having spiral teeth, and gears commonly described as hypoid gears. Although the invention has special utility in operations which involve rough cutting and finish cutting of hypoid pinion gears, it is to be understood that the principles of the invention can be applied to any gear or bevel gear cutting machine or operation. The specific improvements of the present invention are concerned with novel constructions for balancing an axially-movable cradle in a cradle housing so that the cradle can advance and return a cutter relative to a workpiece in a machine which is designed for very high speed gear cutting operations.

In prior cradle construction, considerable cradle unbalance has been encountered due to unsymmetrical construction of the cradle. It can be appreciated that cradle assemblies are relatively large and heavy, and it is difficult to control the balance requirements for a cradle during its construction and assembly. Prior practice has attempted to overcome this problem by counterweighting portions of a cradle during its manufacture, but such counterweighting has not provided for an adjustment of cradle balance once a machine is set up and ready for operation. This prior practice necessarily limits the adaptability of a machine to completely differing cutting setups which adjust the position of a cutter and other elements associated with a cradle. Thus, the prior practice of counterweighting has often involved a compromise balancing of a cradle so that the cradle assembly can be used in different setups, and this provides less than optimum balancing for any given cutting operation and setup. Accordingly, it has been a further prior practice to utilize so-called cradle brakes which are designed to apply a drag on the cradle to resist rotational momentum of an offcenter cradle assembly so that a reasonably uniform torque is maintained on the cradle drive. Of course, wide fluctuations in torque, and especially reversal of torque occuring if the cradle center of gravity should pass over a "dead center" position in a generating roll, can have detrimental effect on the work being produced. Although cradle brakes are intended to resist such wide fluctuation in torque, the mechanisms required for cradle brakes can be a maintenance problem.

According to this invention, a means is provided for adjusting cradle balance after final assembly of a machine. This arrangement permits an adjustment of cradle balance to compensate for any variations in cutter sizes or cutter positioning that might result from adapting a particular machine to different cutting operations. Under certain operating conditions, it is sometimes desirable to provide a known out-of-balance condition for a cradle assembly and the adjustment means provided by this invention permits a precise and careful control of any balance, or out-of-balance, condition that may be desired.

In accordance with the invention it is contemplated that a major part of cradle unbalance will be eliminated by techniques of statically balancing each of the cradle's subassemblies before final assembly. Such preassembly balancing may include such subassemblies as the cutter spindle housing assembly, the swivel head, and the eccentric and cradle itself. However, after the cradle is assembled, there is provided a further means for adjusting the balance of the cradle by adding or subtracting known weights to the peripheral circumference of the cradle. It is known in this art to provide gear cutting machines with means for relating movements of a work spindle relative to a cradle which carries a gear cutter. For example, in a typical arrangement for cutting hypoid pinion gears, it is necessary to periodically move a workpiece toward and away from the cutter carried by the cradle so that indexing can take place upon completion of each cutting of the workpiece. Also, the workpiece may be moved relative to the cutter while cutting is actually being performed, and while the cradle is being rolled or rotated, so as to generate a preferred curvature and profile for a hypoid gear tooth. In order to provide for relative movement between a workpiece and a cutter, prior art arrangements have been mainly concerned with providing means for advancing and retracting a work spindle upon which the workpiece is carried, and cradle movements have been limited to rotational movements involved in rolling the cradle so that spiral or hypoid gear curvatures can be generated. A typical prior art type of machine which is in major use at the present time is illustrated in U.S. Pat. No. 2,667,818 to Stewart et al. Another prior art arrangement in gear cutting machines has provided for movement of the entire cradle assembly, including the cradle housing, relative to a workpiece spindle, and this arrangement has required relatively cumbersome mechanisms for advancing and retracting the heavy weight of a complete cradle assembly and housing. It is also known to reciprocate just the tool of a different type of gear manufacturing machine, as shown in U.S. Pat. No. 1,979,870 to Condon, but such spindle motion is not appropriate to the manufacture of generated gears.

The novel balancing structure which comprises the invention herein is disclosed as a part of a gear cutting machine which provides for a novel axial movement of a cradle within a cradle housing so that very rapid relative movements between a cutter and a workpiece can be achieved by a high speed gear cutting machine. The disclosed gear cutting machine has a capability of operating at a rate which is very substantially faster than machines which are in common use at the present time, and therefore, it is necessary to provide for relatively rapid movements between a cutter carried by a cradle and a workpiece carried on a work spindle. The mechanism for providing axial movements to a cradle include a pressure exerting means for moving the cradle in one direction and a crank means for moving the cradle in an opposite direction. The pressure exerting means can be restrained and controlled by the crank means so that variable rates of movement in either direction can be attained with great precision. On the other hand, the movement by the crank means in conjunction with the pressure exerting means can be accomplished very rapidly, as might be desired when rapidly retracting and advancing a cutter away from and toward a workpiece for allowing an indexing of the workpiece to the next cutting position. Thus, the disclosed gear cutting apparatus is provided with means to advance a cradle at a carefully controlled rate toward a work spindle, and means are also provided for rapidly moving the cradle away from a work spindle if such a movement is desired for indexing. In cutting hypoid gears, and in particular hypoid pinion gears, it may be desirable to not only move a workpiece and a cutter relative to one another for indexing, but also to move a cutter and workpiece while they are engaged in a cutting operation. Such movement is required for controlling the helical motion of the cutter while a curved tooth profile is being finish cut. The control mechanisms of the disclosed gear cutting apparatus, as combined with the means for providing axial movement of a cradle, provide all desired indexing and helical motions that may be required for generating a variety of bevel gears in a single machine. Thus, the machine disclosed herein is adaptable to both rough and finish cutting of all forms of bevel gears, and all cutting operations are carried out with precision and at much higher rates of cutting than attainable with prior art arrangements.

In addition, the disclosed apparatus includes a special mounting arrangement for the cradle within its housing so as to provide fluid bearing surfaces for portions of the cradle which are journaled within the housing for movement relative to the housing. The improved bearing surfaces allow desired changes of motion of the relatively heavy cradle to take place at the rapid rates of change which are necessary for machines of the type disclosed herein. Because of the relatively heavy weight and momentum of a cradle which is being moved through a pattern of movements, the bearing supports are constructed to also provide a certain amount of braking or stabilizing action to retard some of the rotational momentum of the cradle. As noted above, the cradle assembly of this invention is provided with means for balancing and counterbalancing the entire assembly in a manner which is more precise than any prior art arrangement. Such a balancing is necessary to prevent an offcenter heavy portion of a cradle from influencing motions or forces which are to be applied to the cradle, and adjustments in balancing are desirable when a machine is adjusted for different types of gear cutting operations.

These and other advantages of the present invention will become apparent in the more detailed discussion which follows, and in that discussion reference will be made to accompanying drawings as briefly described below.

DETAILED DESCRIPTION OF DRAWINGS

Means for Controlling Axial Movements of Cradle

Figure 1:
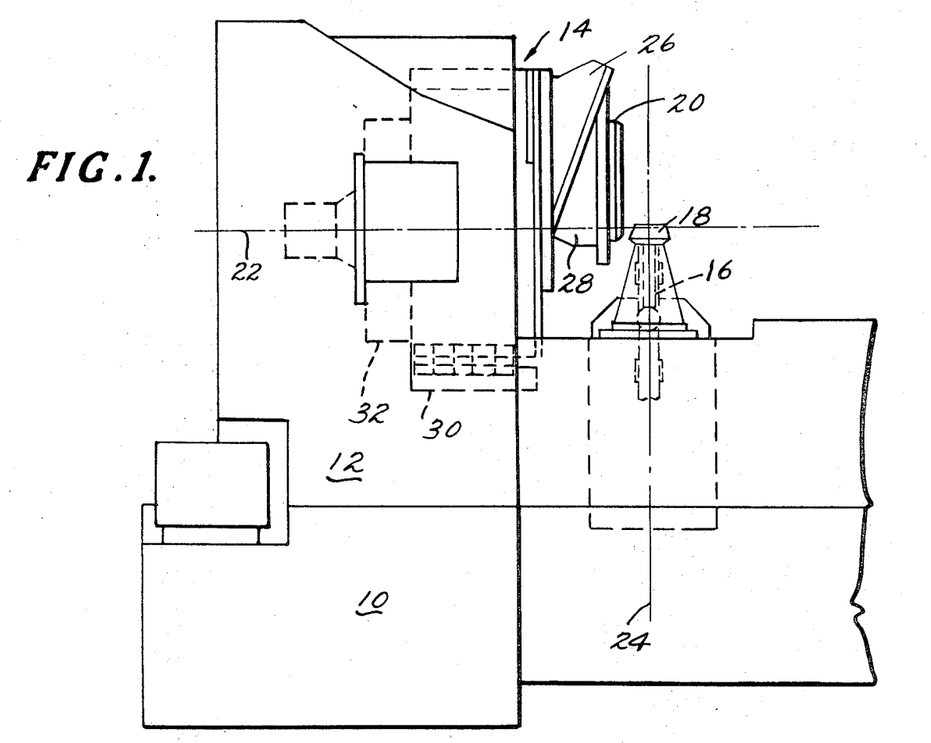
FIG. 1 is a front elevational view which schematically illustrates the general layout and relationship of basic elements in a single gear cutting machine which can cut bevel gears.

FIG. 1 illustrates the general layout of a single gear cutting machine which incorporates the features of the present invention. The machine which is illustrated is considered in this industry to be a "left-side" single machine, and a virtual mirror image of such a machine can be connected to the right side thereof to provide a dual machine which can perform cutting operations in two work stations. However, the following discussion will be limited to a description of to a description of a single machine incorporating the improved cradle assembly of this invention, and it is to be understood that the same improvements can be utilized in dual machines or in any machine requiring rapid and controlled movements of a cradle or its equivalent. In FIG. 1, the front of the machine faces the viewer, and the left side of the FIG. may be considered an end of the machine. The illustrated machine includes a base frame 10 and a relatively large housing 12 for supporting a cradle 14. In addition, the machine includes a work spindle 16 which carries a workpiece 18 for being cut by a controlled engagement with a rotating cutter 20 which is carried by the cradle 14. The work spindle 16 is of a known construction and includes known means for rotating the workpiece. It can be seen that the axis of rotation of the cradle 14 is generally horizontally disposed, as at 22, while the axis of rotation for the work spindle is generally vertically disposed along the line 24. However, other relationships between a cradle and a work spindle may be provided in any given machine construction, and the features of the present invention can be incorporated in such variations. In addition to the basic features just described, the cradle 14 also carries a swivel head 26 and a carrier 28 which supports the cutter 20. The swivel head and carrier members are of known conventional constructions, having known functions, as described in U.S. Pat. No. 2,667,818 to Stewart et al., for example. As schematically shown in the FIG. 1 layout, the main body of the cradle 14 has an outer configuration which includes a relatively large cylindrical profile 30 and a smaller cylindrical profile 32. The cylindrical configuration of the cradle 14 permits the cradle to be journaled within the cradle housing 12 so that axial movements, as well as conventional rotational movements, can be applied to the entire cradle 14. Axial movements of the cradle involve movements toward and away from the workpiece 18 along the longitudinal axis 22 of the cradle. Rotational movements of the cradle are concerned with rolling movements attainable by rotating the cradle back and forth about its axis 22, and such movements are well known and conventional in this art.

Figure 2:
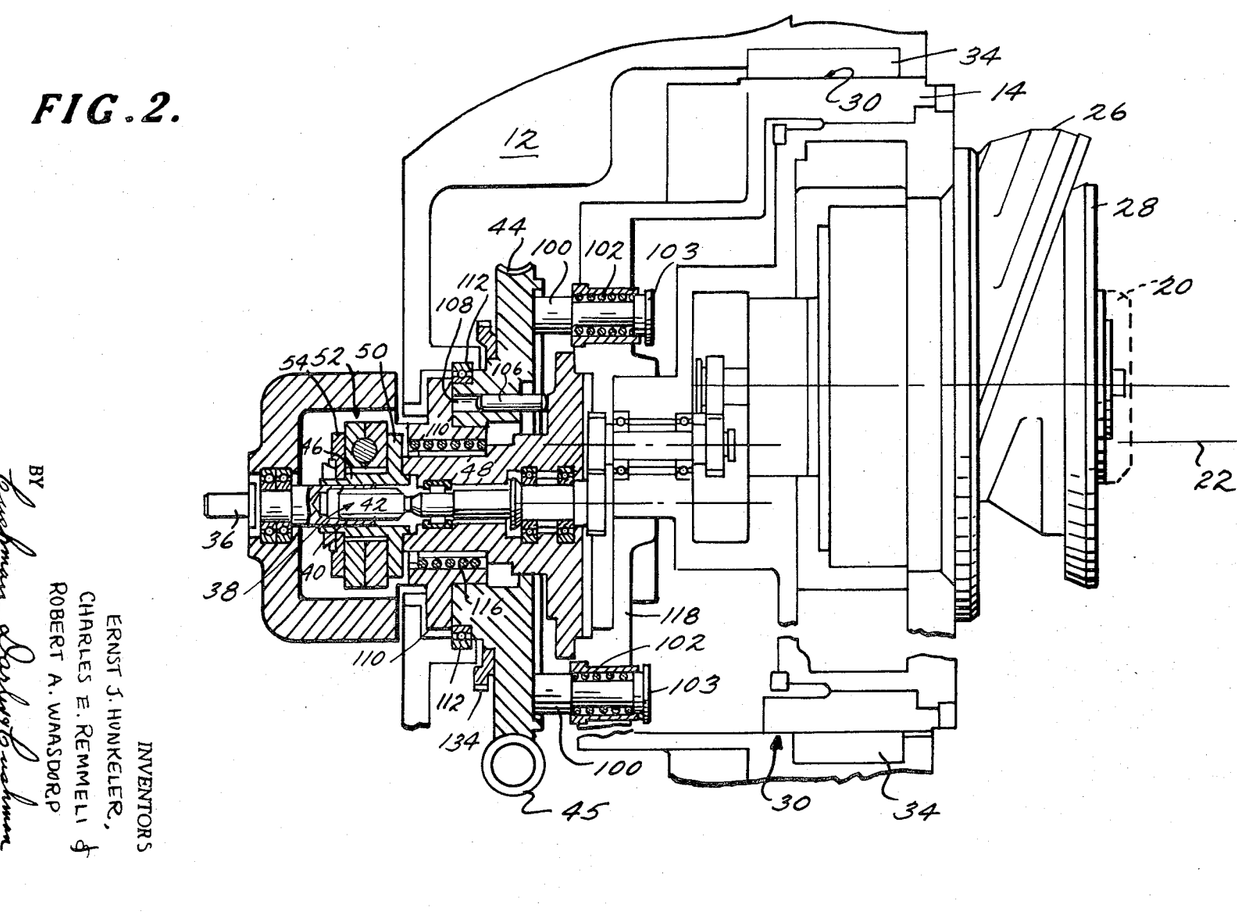
FIG. 2 is an elevational view, partly in cross section, of the cradle assembly portion of the machine shown in FIG. 1.
Figure 3:
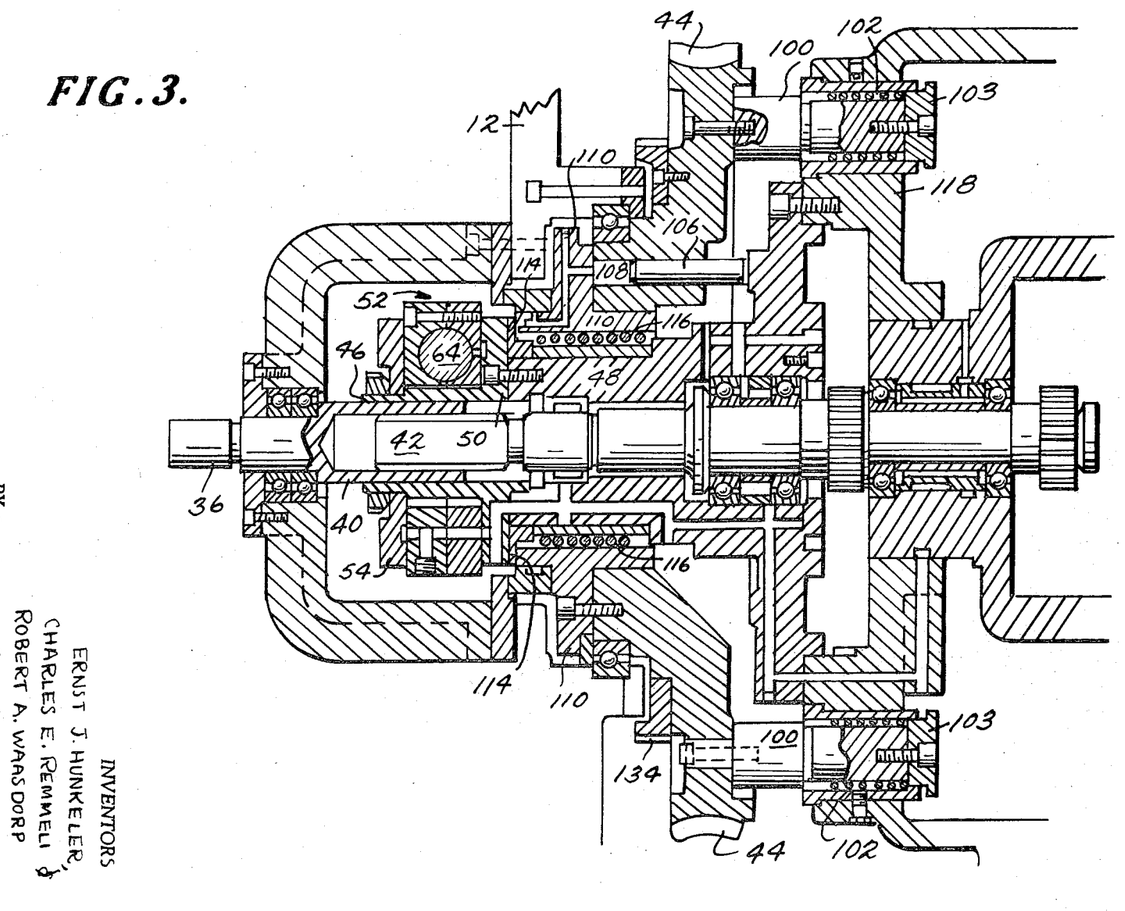
FIG. 3 is a top plan view, partly in cross section, of the cradle assembly portion shown in FIG. 2.
Figure 4:
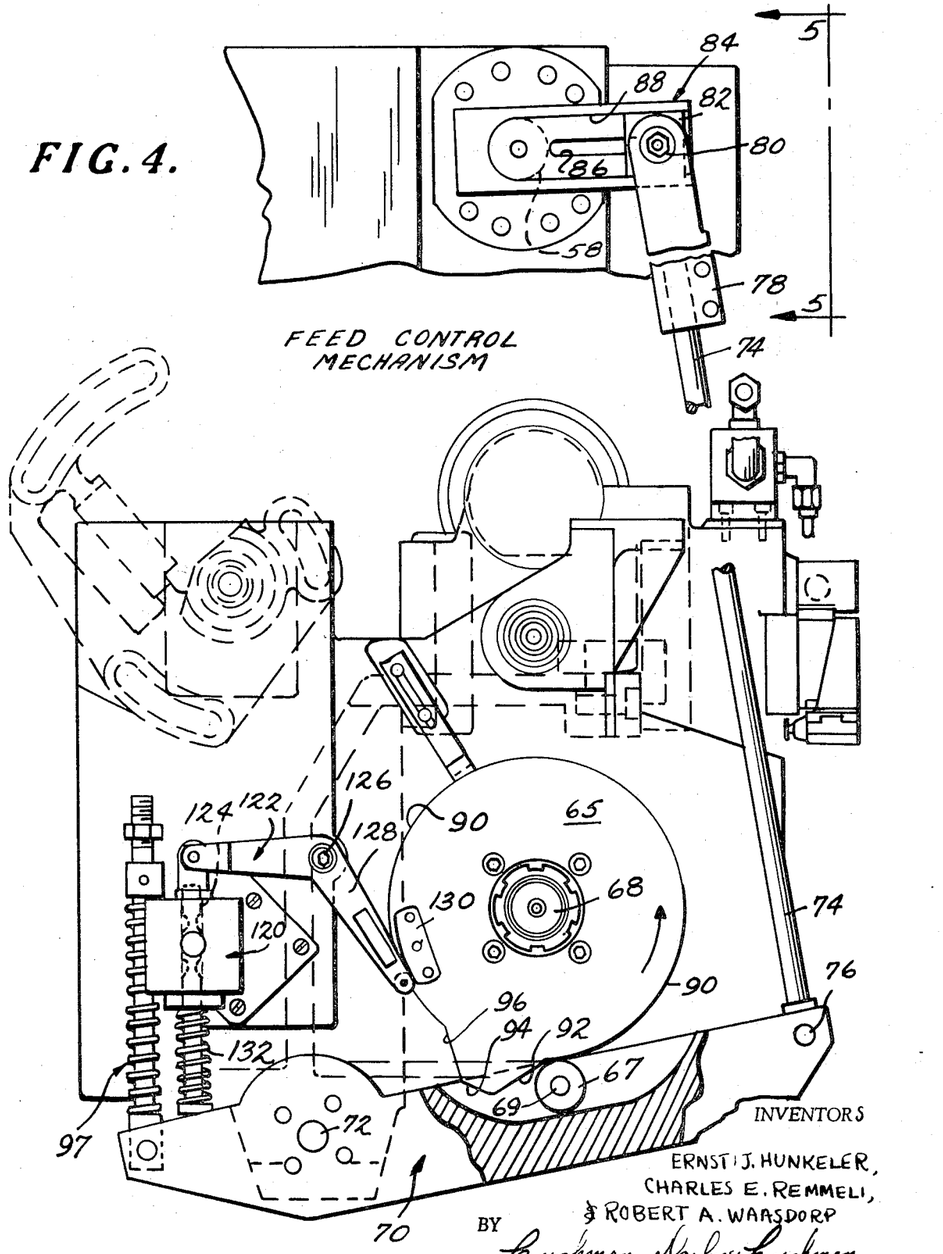
FIG. 4 is an elevational view of a portion of the machine, as seen from an opposite side from that of FIG. 1, with some of the machine housing removed to reveal a first cam and follower means associated with controlling axial movements of the cradle.

FIGS. 2 through 7 illustrate details of the novel cradle moving means by this invention. FIG. 2 is an elevational view of the cradle 14, as journaled within the housing 12, and portions of the view are in vertical cross section to illustrate detail. The larger cylindrical surface 30 of the cradle is shown as being supported within the cradle housing 12, and special bearing elements indicated generally at 34 (which will be discussed in greater detail in another part of this application) are shown for providing a bearing support of the cradle within the housing. In addition, the bearing members 34 provide lubrication of the cradle surface 30 so that axial and rotational movements of the cradle can be achieved within the housing 12. The illustrated cradle assembly includes a number of conventional features for effecting rotation of the cutter 20 and rolling movements of the cradle about its axis 22. For example, a drive shaft 36 is connected to any suitable drive train for receiving rotational movements from a power source. Rotational movements of the drive shaft 36 are relayed to the cutter 20 so that the cutter can be continuously rotated while a cutting operation is being performed. Between the drive shaft 36 and the cutter 20, a series of driving elements and gears are operatively connected together to relay rotational movements of the drive shaft 36 to the cutter 20 while at the same time permitting angular and radial adjustments of the cutter 20 relative to the rotational axis 22. Such adjustments are effected with known mechanisms of the type illustrated in U.S. Pat. No. 2,667,818 to Stewart et al. In addition, the cutter 20 may be rotated through a drive train of the type described in the above mentioned Stewart et al. patent, or it may be driven by its own separate power source for higher speed cutting operations. The drive train elements between drive shaft 36 and cutter 20 include a telescoping portion 38 which may be positioned at any convenient place to allow axial movements of the cradle relative to the main drive shaft 36. In the illustrated embodiment, the telescoping portion of the main drive shaft 36 includes an end portion in the form of a sleeve 40 which can receive a splined shaft 42. Such an arrangement permits telescoping movements of the shaft 42 relative to the main shaft 36 while rotational movements are being applied to the cutter 20. The remainder of the drive train within the cradle assembly for effecting rotational movement of the cutter is fairly conventional in its structure and function, and suitable bearings and gearings are provided wherever necessary to permit rolling movements of the cradle and angular and radial adjustments of the cutter 20. Reference is made to FIG. 4 of U.S. Pat. No. 2,667,818 to Stewart et al., for a detailed description of a typical drive train for imparting rotational movements to a cutter.

The cradle 14 can also be rotated back and forth on its axis 22 to generate a roll during the cutting of a gear tooth. Roll of the cradle is accomplished through driving movements being imparted to a cradle drive gear 44. The cradle drive gear 44 is driven by gear 45, and known means are provided for reversing rotational movement of the cradle. The rolling movement of the cradle, through the gear 44, can be accomplished in any well known manner to provide a roll of the cradle during a gear generation cutting process and to provide a return of the cradle to a starting position at the end of the cutting process. The driving arrangements for imparting roll to the cradle does not form a separate part of the present invention, and therefore, reference is made to the above mentioned Stewart et al. patent or to a copending application owned by the assignee of this application and filed on even date herewith on the subject of control arrangements for generating trains of bevel gear making machines.

In the disclosed apparatus, axial movement of the cradle 14 may be effected by a crank member which is controlled to move in both axial directions of movement available for the cradle. However, it is also preferred that a pressure exerting means be provided to effect movement of the cradle in one direction (even though the crank member may restrain or otherwise accommodate movement in the one direction) so that the rate of movement can be carefully controlled or varied, as may be desired for certain gear cutting operations. In the embodiment which will be discussed below, the pressure exerting means is utilized to move the cradle 14 in a direction toward the workpiece 18, and return of the cradle, in an opposite direction, is accomplished by a crank member and associated control means.

Referring to FIGS. 2 and 3, it can be seen that a sleeve member 46 is secured to a reduced end portion 48 of the cradle (at the left of the drawings). The sleeve member 46 includes an integral flange 50 which functions as a stop against which a shoe means 52 may be received. A plate 54 is mounted and secured against a shoulder formation on the sleeve 46 so as to define an opposite bearing surface for the shoe member 52. Therefore, it can be appreciated that the flange 50 and the plate 54 define a yoke means, and that axial movements of the shoe member 52 will bear against either the flange 50 or the plate 54 to impart axial movements to the entire cradle 14. The sleeve member 46 and the plate 54 may be secured in fixed positions relative to the remainder of the cradle by any well known means.

Figure 5:
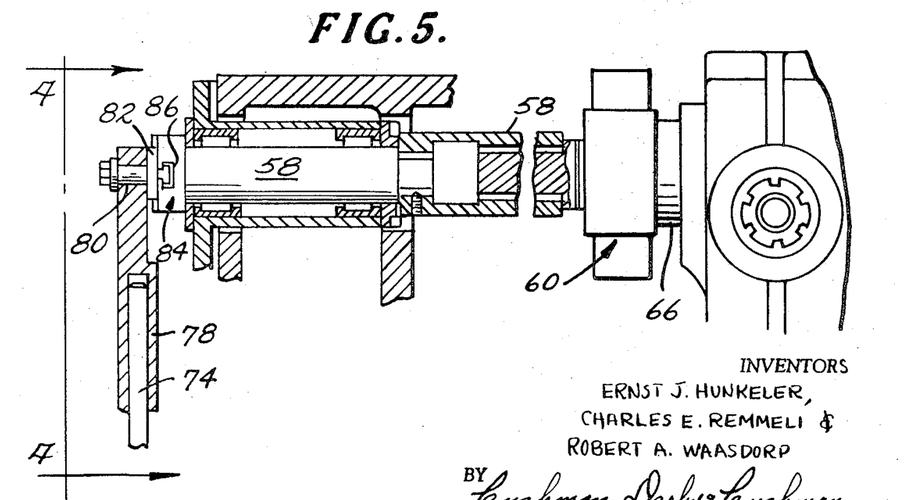
FIG. 5 is a view looking toward an end of the machine, of additional structure associated with the mechanism shown in FIG. 4.
Figure 6:
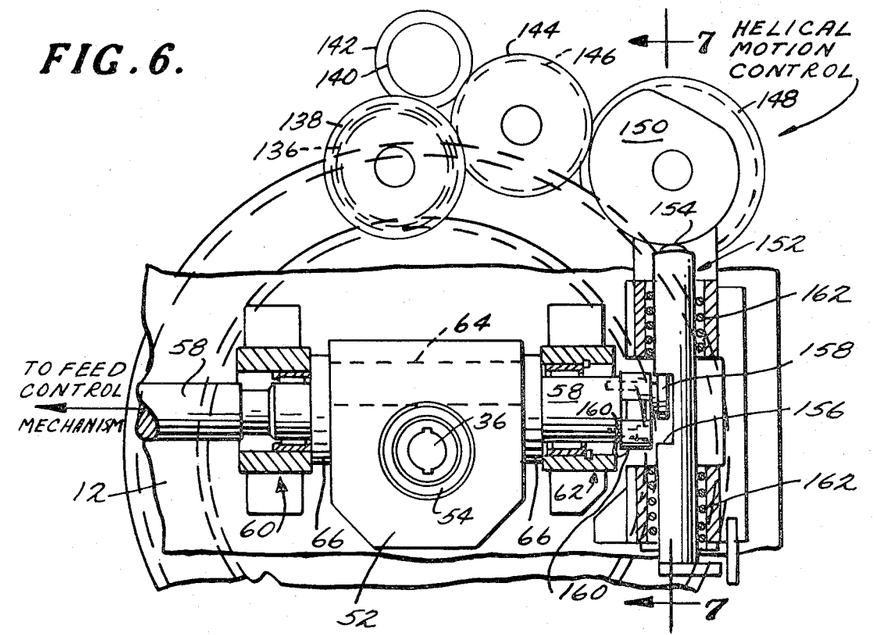
FIG. 6 is an end elevational view of an exposed portion of the machine and illustrating a second cam and follower means which is associated with control of axial movements of the cradle.

FIGS. 4 through 7 illustrate details of feed control mechanisms associated with the control and operation of a crank member 58 which moves the shoe 52 back and forth to effect axial movements of the cradle. As seen in FIG. 6, the crank 58 is journaled to a back end portion of the cradle housing 12. The crank 58 is preferably an integral structure which includes a first segment supported in bearings in a support block 60 so as to be rotatable therein, a second segment journaled in bearing surfaces in a second support block 62, and a crank pin 64 which is interposed in an offset position between the two crank arm segments. The crank pin 64 may alternatively consist of two pin segments spaced axially from one another in a position offset from the rotational axis of the two segments of crank arm 58. The crank pin interconnects the two segments by way of members 66 formed integrally with the crank segments and the pin so that rotational movement of the crank 58 will move the pin 64 eccentrically about the rotational axis of the crank 58. Thus, limited oscillations of the crank 58 cause the pin 64 to move back and forth in a way which will advance and retract the entire cradle by a movement of the shoe means 52. The shoe means may be assembled from two separate plate members, and the two plate members are formed to include a transverse bore between them to accommodate the pin 64. The two plate members making up the shoe means 52 are mounted between the plate 54 and flange 46 to permit axial movement of the cradle (and the plate 54 and flange 46 fixed thereto) without any rotational movement of the shoe means 52. Also, the shoe means 52 is constructed to allow some vertical movement of the shoe means relative to the yoke assembly so that the pin 64 can follow a curved path of travel when it is oscillated back and forth by the crank 58. Lubricating means are provided to lubricate the surfaces of the shoe means 52 and of the pin 64, wherever necessary. With the elements which have been just described, it can be seen that rotational movements applied to crank 58 cause generally axial movements of the shoe 52 relative to the fixed rotational axis of the crank arm. The generally axial movements of the shoe 52 are translated into axial movements of the cradle 14 (to the left and right, as viewed in FIGS. 2 and 3) since the shoe 52 bears against a yoke assembly formed by flange 46 and plate member 54 of the cradle.

Figure 7:
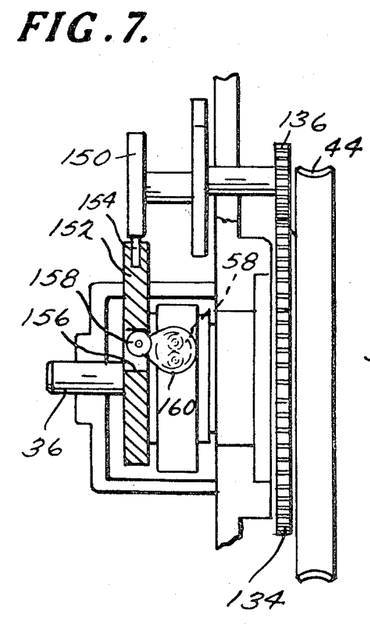
FIG. 7 is a front elevational view of a portion of the structure shown in FIG. 6, showing additional detail of the second actuating mechanism.

The crank 58 is oscillated back and forth in accordance with a controlled pattern of movements derived from one of two major control means which will be discussed in this specification. A first control means is illustrated in FIGS. 4 and 5 for relating axial movement of the cradle 14 to the direct drive of the gear cutting machine, and a second control means is illustrated in FIGS. 6 and 7 for relating axial movements of the cradle to rotational movements of the cradle. Either control means may override the function of the other, and thus, it is possible to utilize both control means in a single machine to obtain a relatively complex pattern of movements of the cradle, such as might be required for finish cutting of hypoid pinion gears. The control means shown in FIGS. 4 and 5 is considered a feed control mechanism and may be utilized by itself or with the second control means. Also, the first control means can be combined with a mechanism included as a part of a ratio control means for rough cutting operations. The mechanism of FIGS. 6 and 7 is considered a helical motion control and may be included in a machine designed for finish cutting of hypoid pinion gears to that the two control means can operate in timed relationship to one another.

Considering the first control means of FIGS. 4 and 5, it can be seen that a cam 65 and its follower 67 are operatively connected to an end portion of crank 58 to impart oscillatory motions to the crank arm. The cam 65 is driven from a main drive shaft 68 (see schematic layout of FIG. 8) and makes one revolution in a counterclockwise direction per tooth cutting cycle to control the feed of the cutter relative to a workpiece. The drive train arrangement for driving the feed cam 65 does not form a separate part of this invention, and reference may be made to known drive trains or to the copending application on the subject of control arrangements for generating trains of bevel gear making machines filed even date herewith for a full description of the drive train shown in FIG. 8. The cam follower 67 is in the form of a roller mounted on a pin 69 carried by a follower arm 70 which is pivoted for rocking motions about a pivotal mounting point 72. The pivotal mounting point 72 is fixed relative to the frame of the gear cutting machine. At one end of the follower arm 70, a rod 74 is pivotally connected thereto at 76 in any well known manner. The rod 74 is secured into an end of a linking element 78, and means may be provided for axially adjusting the rod 74 relative to the linking element 78. The linking element 78 is pivotally bolted at 80 to a slide block 82 contained within a channel 88 formed in crank arm 84. The block 82 is adjustable in its position along the length of the crank arm 84, and its adjusted position can be secured by a nut and bolt arrangement at 80 which connects the linking element 78 to block 82 and into a T-slot 86 formed within the channel 88 of the crank arm 84. Rotation of the cam 65 changes the position of follower arm 70 relative to the cam surface of the cam 65, and this change in position effects an oscillatory motion of the crank 58 about its longitudinal axis of rotation. As shown in FIG. 5, the crank 58 may be made up of segments which are splined, or otherwise connected, together so that rotational movements which are applied to the crank will be transmitted to the pin 64 carried by the crank 58.

From the position shown in FIG. 4, the follower 67 is shown at the end of a relatively long dwell path 90 defined on the cam 65. This dwell path corresponds to a position of the cradle which is closest to a workpiece so that no withdrawal movement of the cradle will be dictated by the cam 65 during a generating roll of the cradle in a cutting cycle. It can be seen that further rotation of the cam 65 in a counterclockwise direction from the position shown in FIG. 4 will move the follower arm 70 downwardly when the follower 67 engages a projection 92 on the cam surface. This movement of the follower arm downwardly will withdraw the cradle by an amount, and at a rate, determined both by the profile of the surface 92 and by the adjusted position of the linking element 78 on the crank arm 84. Another dwell surface 94 may be provided on the cam to stop axial movement of the cradle for a short period of time while indexing of the workpiece can take place, and the cam surface 96 allows a return movement of the cradle in the direction of the workpiece until dwell surface 90 is once again approached. The follower arm 70 is normally biased downwardly at its left end (as viewed in FIG. 4) by a spring means 97, and thus, the follower 67 is normally urged toward the peripheral surface of the cam 65.

Although the control means which is shown in FIG. 4 can be utilized for effecting axial movement of the cradle in both directions, a preferred arrangement for hypoid gear cutting machines provides for a separate means for advancing the cradle toward a workpiece, although the control mechanism of FIG. 4 may still assist in a control of the advance of the cradle. In such a preferred arrangement, the follower 67 may be slightly out of contact with the dwell surface 90 so that other control means can override and dictate adjustments in the axial position of the cradle during actual generation of a gear tooth. Also, it is preferred that a hydraulic system, which may be considered a pressure exerting means, be utilized as the separate means for advancing the cradle toward a workpiece so that precise control of the rate of advance can be attained and adjusted.

The pressure exerting means which has been just mentioned above can be best understood by referring back to FIGS. 2 and 3. In those FIGS. it can be seen that the cradle 14 is rotated for rolling motions by a circular drive gear 44. However, the drive gear 44 does not move in axial directions with the movement of the cradle and is axially fixed relative to the housing 12 so that it can only rotate within the housing. In order to impart rotational movements from the drive gear 44 to the cradle 12, drive pins 100 (which may be four in number) are rigidly bolted or secured to the drive gear 44, and the drive pins make driving contact with the cradle 12 in sleeve bearings 102. The drive pins 100 move in and out of the sleeve bearings 102 during axial movements of the cradle, and the enlarged end portions 103 of the pins function to facilitate assembly and to maintain the sleeve bearings in position during such axial movements of the pins. The drive pins 100 may have reduced intermediate portions which are received within the sleeve bearings 102 so that ball bearings or other bearing structures associated with the sleeve bearings can be received and carried on the drive pins. The pressure exerting means includes a hydraulic system which applies fluid pressure to piston elements 106 mounted for sliding movement in piston chambers 108. Any suitable means may be used for carrying hydraulic fluid into and out of the cylinders 108 from a source of fluid under pressure, and a filling of the chambers 108 with hydraulic fluid forces the cradle to move in an axial direction toward a workpiece. In the construction shown in FIGS. 2 and 3, it can be seen that fluid pressure within the chamber 108 acts against a flanged element 110 which is bolted to the drive gear 44. Both the flanged element 110 and the drive gear 44 are constrained against axial movement in the cradle housing 12, but both the flanged element and the drive gear are free to rotate within the cradle housing by means of well known antifriction radial bearings and two-direction thrust bearings 112. The full inward position (the position closest to a workpiece) of the cradle may be limited by an abutment of a flanged spacer 114 against an annular rearward extension of the flanged element 110 (see FIG. 3). The spacer 114 is clamped between the flange portion 50 of sleeve 46 and the inner race of an antifriction bearing 116 which is mounted on the rearwardly extending portion of the cradle. However, the flanged portion of spacer 114 may be omitted from machines which are set up to control the axial position of the cradle during the generation of a gear tooth as well as during indexing operations, and such machines will be discussed in greater detail below. The rearwardly extending portion 48 of the cradle is bolted to the portion 118 of the cradle so that both portions rotate as an integral cradle unit. Thus, there is no relative rotational movement borne by the sleeve bearings 116 since the flanged element 110 is also bolted to a rotating element, the drive gear 44. The bearing 116 functions to reduce friction for axial movements only since the flanged element 110 does not move axially but the rearwardly extending portion 48 does move axially.

The pressure exerting means has been discussed above as including a hydraulic system which is controlled in a known manner by conventional valving and control devices. One manner of relating the control of the hydraulic system to desired movements of the cradle is illustrated in FIG. 4 wherein a valve control box 120 is inserted in the fluid line which carries hydraulic fluid both into and out of the chambers 108 associated with the pistons 106 (see FIG. 2). The valve box 120 carries a spool valve, or other valving device, for controlling the admission and release of hydraulic fluid (and pressure) into and out of the chambers 108. The valve which is contained within the valve box 120 is actuated by a lever 122 which functions to move a rod 124 which is affixed to the valve within the valve box 120. The lever 122 is pivotally mounted at 126 so that its follower arm portion 128 can transmit movements to the valve rod 124. It can be seen that a separate cam surface 130 is provided on the cam 65 to periodically contact the lever 122, 128 so as to lift the valve rod 124. Lifting of the valve rod 124 functions to dump hydraulic fluid from the chambers 108 (FIG. 2), and this releases pressure within the system so that the cradle can be moved away quickly and easily from a workpiece by movements dictated by the surface 92 of the cam 64. In can be seen that dumping of hydraulic fluid, as dictated by the cam surface 130 coincides with the return movement of the cradle, as dictated by the cam surface 92. The valve rod 124 extends completely through the valve box 120 and is normally biased to a lower limit position by a compressed spring means 132. Upward movement of the rod 124 compresses the spring means 132, and as soon as the follower arm 128 of the lever 122 is released from contact with the cam surface 130, the valve rod 124, and the valve body attached thereto, are moved downwardly to a position which redirects a flow of hydraulic fluid into the chambers 108. Thus, as soon as a withdrawal movement of the cradle has been completed, hydraulic fluid is once again introduced into the cylinders 108 to initiate an advancing movement of the cradle toward a workpiece. Such withdrawal is generally required when the workpiece is being indexed to present a new surface for cutting.

Figure 8:
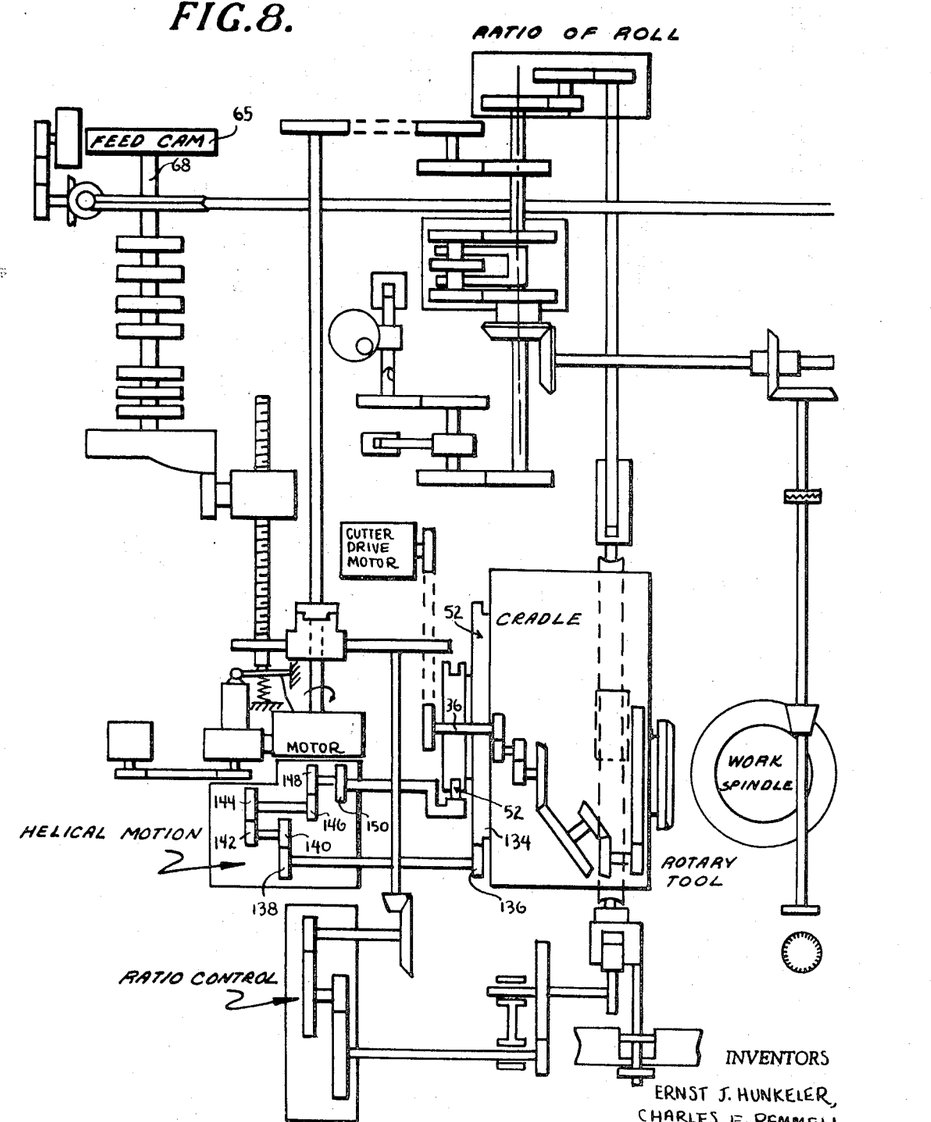
FIG. 8 is a schematic layout showing relationships of drive train elements associated with the machine of this invention.

FIGS. 6 through 8 describe a separate control mechanism which may be included as a part of the axial control system for a cradle where it is desired to control helical motion of the cradle during the cutting of a gear. Helical motion is employed in some cutting methods on gear finishing machines, and basically, helical motion is concerned with providing a timed relationship between rotational motion of the cradle and axial motion which is obtainable by the mechanisms of the present invention. FIGS. 6 and 7 illustrate a helical motion mechanism, which may be considered a second control mechanism for the crank 58, and FIG. 8 illustrates a general layout of drive train elements which are included in a machine of the type disclosed herein. A detailed discussion of the complete drive train is included in the copending application on the subject of control arrangements for generating trains of bevel gear making machines, and filed even date herewith. Referring back to FIGS. 2 and 3, it can be seen that a second circular gear 134 is secured to the main drive gear 44 of the cradle. The second gear 134 is also shown in the schematic layout of FIG. 8. Since the gear 134 is rigidly secured to the main drive gear 44, all rotational movements of the cradle, as dictated by the main drive gear 44, are applied to the gear 134. Thus, whenever the cradle is rotated in accordance with well known patterns of movement required for cutting spiral or hypoid gears, the gear 134 is rotated in the same direction, and of course, when the cradle rotations are reversed, rotations of the gear 134 are reversed. The gear 134 functions as a drive gear for the helical control mechanism which is shown in FIGS. 6 and 7. As shown in FIG. 8, the drive gear 134 rotates a drive train which includes a pinion 136 which is drivingly connected to four helical motion change gears 138, 140, 142 and 144 and to gears 146 and 148 which drive a cam 150 (also see FIGS. 6 and 7). The gears which are included in the drive train are keyed, or otherwise secured, to shafts upon which they are mounted so that all rotational movements from the drive gear 134 are imparted to the cam 150. The helical motion change gears 138 through 144 may be removed and changed for providing preferred gear ratios to relate helical motion of the cradle to rotation of the cradle in a desired timed relationship. The gear 148 which drives the cam 150 may be drivingly connected to the cam through an angularly adjustable fine tooth face coupling, not shown. As shown in FIGS. 6 and 7, a cam follower 152 (having a roller element 154 for contacting the peripheral surface of the cam 150) is mounted to reciprocate relative to the rotating cam 150. The follower 152 has a slot 156 formed therein to receive a cylindrical roller eccentric 158 carried by a crank arm element 160 which is bolted and doweled to the right end segment of crank 58. The follower 152 may be mounted in sleeve bearings 162 so as to be easily reciprocated in response to contact with the peripheral surface of the cam 150. As stated above, the second cam and follower mechanism which is illustrated in FIGS. 6 and 7 cooperates with the general movements dictated by the first cam and follower mechanism illustrated in FIGS. 4 and 5. However, when the feed cam 65 of FIG. 4 is in a position in which the follower 67 is not being actuated (such as on the dwell position 90 when the follower 67 may be out of any actual contact with the surface 90), then, the second control system of FIGS. 6 and 7 can dictate further control movements to the cradle. The dwell position 90 of the cam 65 corresponds to a position of the cradle which is near to or at the limit position closest to a workpiece, and thus, the cutter which is carried by the cradle would normally be cutting and generating a gear in such a position. When it is desired to control helical motion of the cutter during such a working position, the second cam and follower control mechanism of FIGS. 6 and 7 is included on a machine, and the profile of the cam 150 dictates certain additional axial movements to the cradle. When the rotating helical motion cam 150 engages the follower roller 154, a rising profile in the direction of cam 150 turning will drive the follower 152 downwardly to turn crank 58 counterclockwise (as viewed in FIG. 7). This counterclockwise movement moves the shoe 52 in an axial direction which withdraws the cradle away from the workpiece by a controlled amount, and this movement operates against the resistance of hydraulic pressure in the cradle actuating cylinders 108. Conversely, a falling profile for the same direction of turning of the cam 150 permits the cradle to be moved further toward a workpiece by continued application of hydraulic pressure in the cradle actuating cylinders 108, and this moves the crank 58 in a clockwise direction which causes a lifting of the follower 152 by the eccentric roller 158. Since a rise in the cam profile of either the feed cam 65 or of the helical motion cam 150 will function to move the crank 58 in the same direction, i.e., a direction which withdraws the cradle away from a workpiece, either of the cams can take control from the other as required during a helical motion cutting operation. Proper timing of the helical motion cam and the feed cam mechanisms is readily obtained with the two control systems shown in FIGS. 4 through 7.

Figures 12, 13, 14, 15:
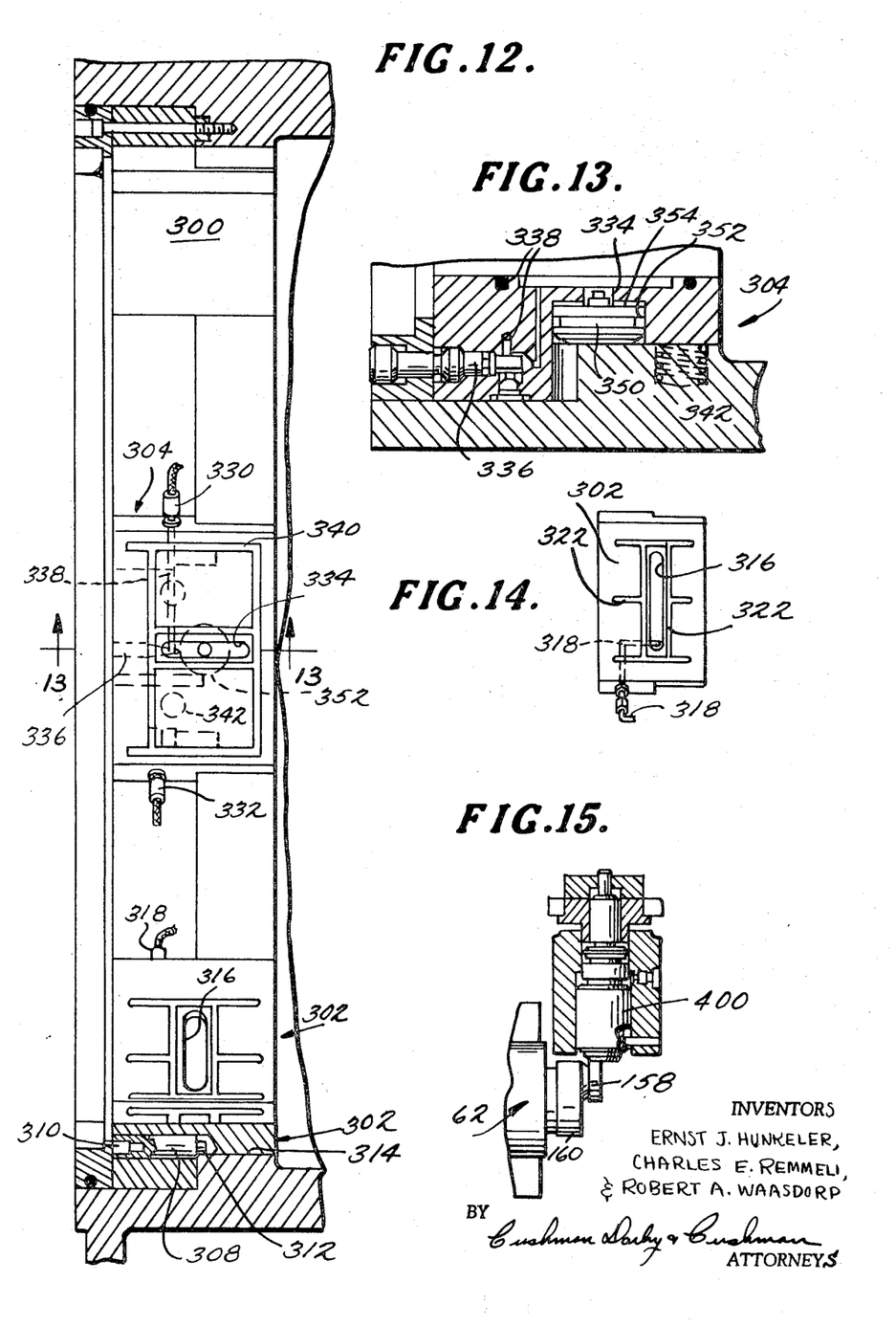
FIG. 12 is a front elevational view, viewing one side of the internal surface of the cradle housing features shown in FIG. 11 (as seen on line 12–12 of FIG. 11)
FIG. 13 is a cross-sectional view of a single bearing support means.
FIG. 14 is a top plan view of one of the bearing supports shown in FIGS. 11 and 12.
FIG. 15 is a view of a ratio control mechanism that may be substituted for the control mechanism illustrated in FIG. 6.

FIG. 15 illustrates a ratio control device which may be substituted for the second control mechanism (helical control mechanism) shown in FIGS. 6 and 7. The ratio control device does not form a separate part of the present invention and is separately described in a copending application on the subject of ratio change mechanisms and setovers for bevel gear making machines, as filed even date herewith. Generally, the ratio control device is concerned with controlling movements of the cradle when the machine is used in a roughing operation, and a piston means 400 is periodically actuated by hydraulic pressure to move the crank eccentric 160 to move the cradle axially at prescribed times in a roughing cycle.

Means for Balancing Cradle

Figure 9:
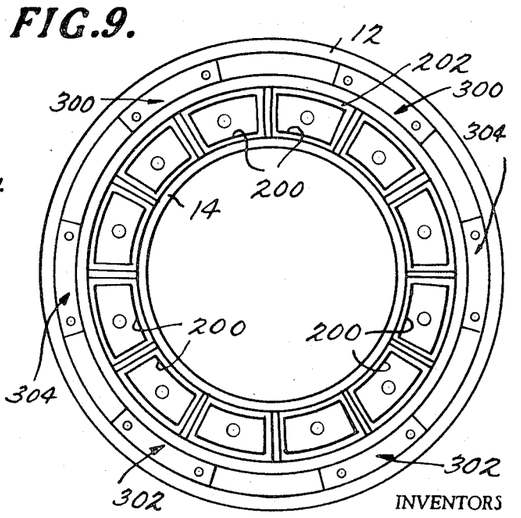
FIG. 9 is a cross-sectional elevational view of a portion of the of the cradle assembly, as seen on line 9–9 of FIG. 10.
Figure 10:
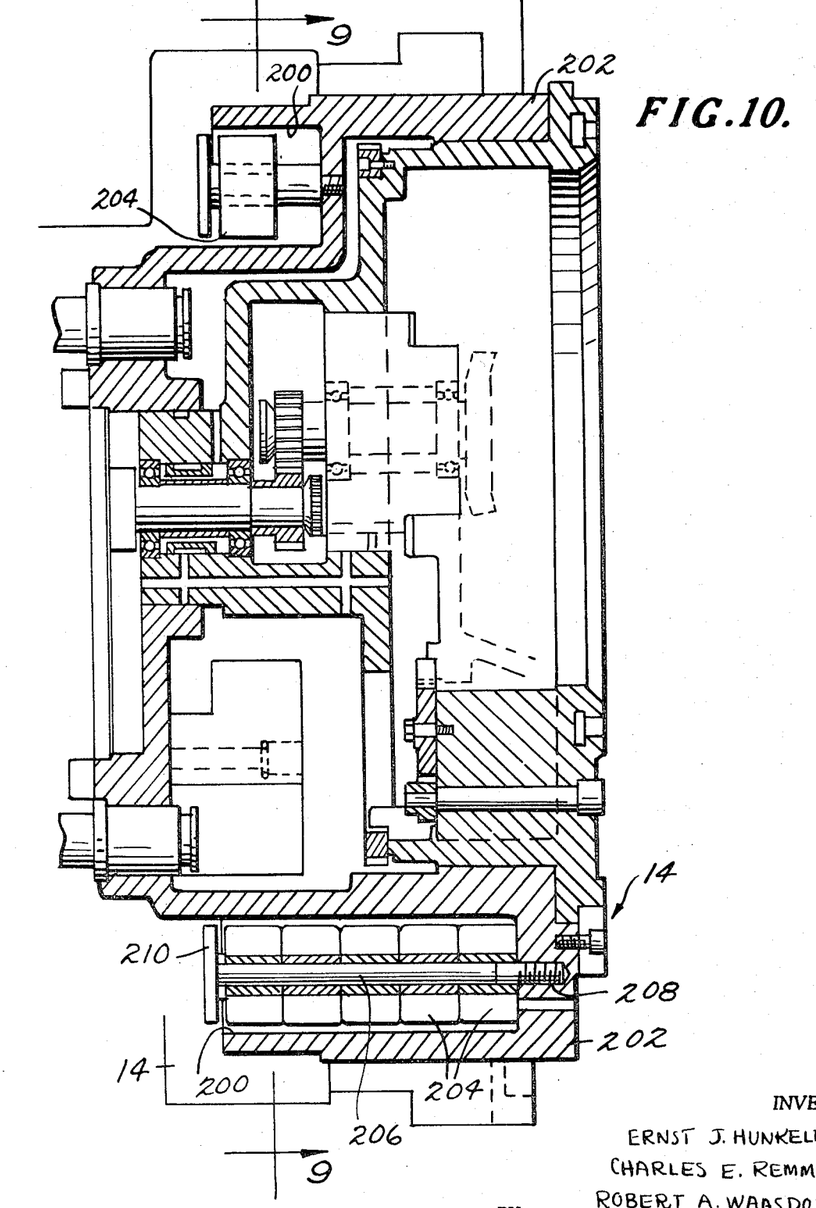
FIG. 10 is a front elevational view, in cross section, illustrating a balancing means associated with the cradle of this invention.
Figure 11:
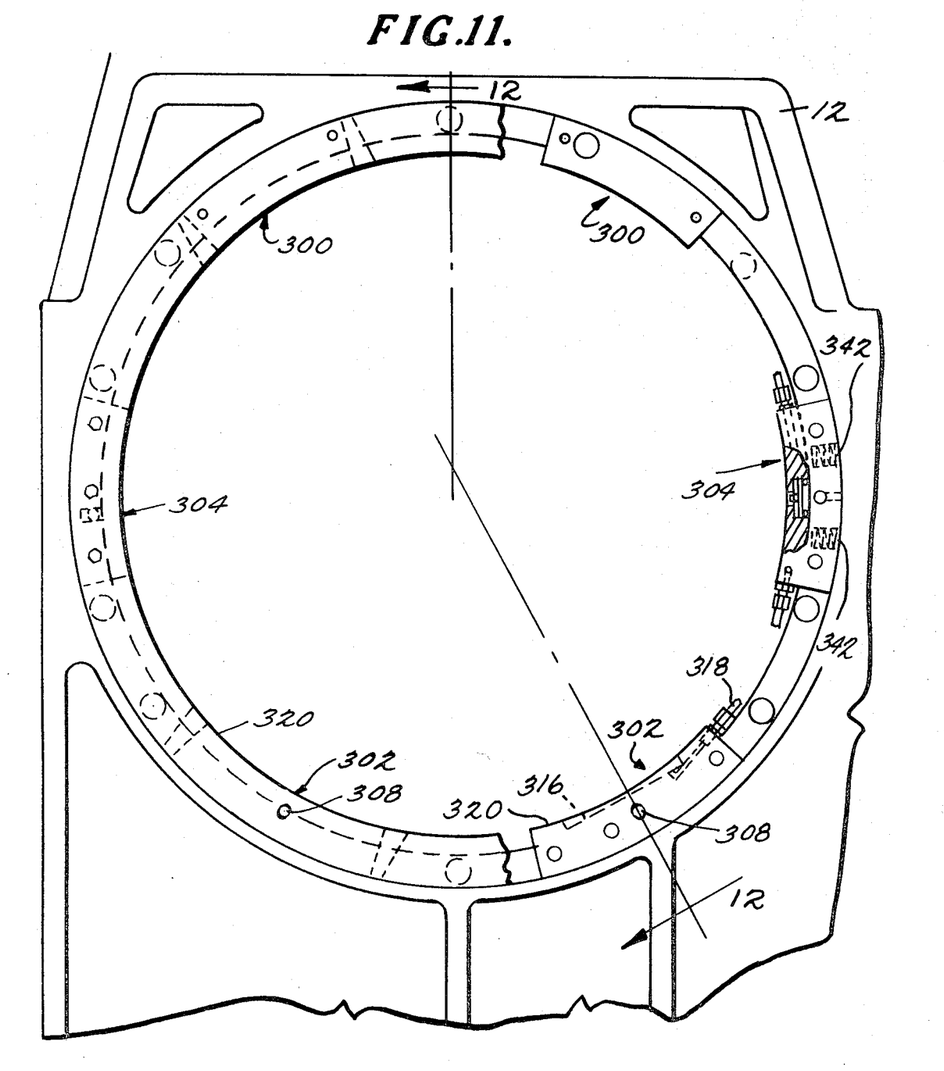
FIG. 11 is an end view, in partial cross section, of bearing support means associated with the journaling of a cradle in a cradle housing.

FIGS. 9 and 10 illustrate a novel means for balancing a cradle assembly, and the balancing means which is illustrated may be used with any known cradle construction as well as with the axially movable cradle described above. Referring to FIGS. 9 and 10, it can be seen that a number of pockets 200 are formed into a circumferential portion of cradle 14. The pockets 200 may be of any desired configuration and depth, and as shown in FIG. 10, pockets at the lower part of the cradle may be designed to accommodate a greater number of weights than pockets located near an upper level of the cradle. Each pocket includes means for receiving and holding one or more weight elements 204. In the embodiment illustrated in FIG. 10, weights 204 are carried on supporting rods 206 which can be threaded into end portions of the pockets 200 at 208. The supporting rods 206 preferably carry handle members 210 which may be in the form of relatively large discs having knurled edges for ease of manipulation, and the handle members 210 are threaded to the supporting rods 206 so that the handles can be easily removed for adjusting the number of weights carried on the rods. Alternatively, the handles can be fixed to the rods so that a turning of the handle will remove the rod and all weights carried thereby. The pockets 200 are located in an accessible portion of the cradle so that an operator may remove any desired number of supporting rods to make adjustments in weight for selected pockets 200 as a machine is assembled. In this manner, a machine which is already assembled an can be adapted to differing types of operations wherein adjustments are necessarily made for various elements of the cradle assembly, and the machine can be balanced (or adjusted to a controlled out-of-balance) in accordance with optimum conditions for a new cutting operation.

Means for Journaling Cradle in Cradle Housing

FIGS. 11 through 14 illustrate views of portions of the cradle housing 12 which support the larger diameter portion 30 of the cradle, and these FIGS. also illustrate special bearing elements 300, 302, and 304 which support a cradle and which include means for applying fluid pressure to the cradle at selected points. The various views which are shown in FIGS. 11 through 14 are not drawn to scale to one another, and therefore, some of the bearing support structure is exaggerated in certain views. This is done to clarify the disclosure of the bearing means associated with the cradle assembly.

As discussed above, the rearward end portion of the cradle 14 is supported in antifriction bearing 112 (see FIG. 2). FIG. 2 also illustrates the general axial location of bearing elements 34 which may correspond to the bearing elements which will be discussed with reference to FIGS. 11 through 14, however, it is to be understood that the bearing elements which are shown in FIGS. 11 through 14 are displaced angularly about the cradle housing from the positions shown for FIG. 2. The positions shown in FIG. 2 are only representative of the axial placement of such bearings and are not intended to describe the precise angular position of the bearings that will be discussed with reference to FIGS. 11 through 14.

As shown in FIGS. 11 through 14, three types of bearing elements may be provided in any given cradle support structure, and each of the types is structurally and functionally different from the other. In the illustrated embodiment, six bearing elements are located in the cradle housing 12, and the six elements consist of two bearing elements 300, two elements 302, and two bearing elements 304, spaced approximately equally from each other about the circumference of the cradle housing 12. The upper two elements 300 function to position a cradle in the housing when assembly is taking place, the two lower bearing elements 302 function to support and lubricate the cradle for all movements within the cradle housing, and the two laterally disposed elements 304 function to support, lubricate, and stabilize the cradle during rotational movements. All six bearing elements are fastened into the cradle housing and are provided with inner circular surfaces which define a circle which is approximately .005 inches larger than the cradle diameter at the cylindrical portion 30 of the cradle. When the cradle is installed, it rests upon the two lower bearing elements 302, and a measurement is made of the radial clearance between the cradle and the two upper bearing elements 300. The lower bearing elements are then moved radially inwardly by means of adjustment eccentrics which function to fix the bearing elements 302 in desired positions relative to the cradle housing and the cradle. As shown in FIG. 12, each adjustment eccentric may consist of a main cylindrical body 308 which can be rotated by turning a tool in an irregular recess 310. Turning movement of the main body 308 about its central longitudinal axis carries an eccentrically affixed end portion 312 into and out of bearing contact with a surface 314 of the cradle housing. The end portion 312 may be formed integrally with the main body 308, and the end portion functions as a cam which can lift the bearing element 302 radially inwardly towards the center of the cradle housing when a contact is made with the surface 314 and continued rotation is applied thereto. Once the lower bearing elements have been adjusted (for example to reduce the measured clearance between the cradle and the bearing element 300 by one-half of the original amount), the cradle will be located in a precise center line condition in the cradle housing. After this alignment has been accomplished, the two upper bearing elements 300 have no further function even though they remain in the assembly, and under normal operations, they do not make actual contact with the cradle.

The lower bearing elements 302 are fastened to the housing and permanently doweled, or otherwise affixed, in the position thus established. Referring to FIG. 14, each of the lower bearing elements has an oil pocket 316 formed in the material from which the element is manufactured. The oil pocket 316 receives a supply of oil from a relatively high pressure source by way of a conduit means 318. The conduit means is connected to any suitable supply of oil which can be controlled, and in an example of actual operation, oil may be supplied at approximately 150 p.s.i. pressure. This relatively high pressure produces a hydrostatic lifting force on the cradle, by the two lower elements 302, which is equal to a large percentage of the cradle weight at the point of contact, thereby substantially reducing the cradle load carried by the frictional surfaces 320 of the bearing elements 302. In addition to the oil pocket 316, each bearing element 302 is provided with shallow oil grooves 322 which are so positioned relative to pockets 316 as to receive a controlled leakage of high-pressure oil from the pocket 316 for lubricating the bearing surfaces 320 and the surfaces of the cradle contacted thereby with a desired oil film thickness.

The side bearing elements 304 have slightly different constructions from the elements positioned at the bottom of the cradle housing. The side elements 304 are supplied with both high- and low-pressure oil by way of conduits 330 and 332, respectively. The high-pressure conduit 330 may be connected to the same source of oil under pressure which supplies the conduit 318 of the lower bearing elements 302, and the low-pressure conduit 332 is supplied from a suitable source with oil under a relatively low pressure (for example, 15 p.s.i. pressure). Each bearing element 304 includes a high-pressure oil pocket 334 similar to the oil pockets 316 provided in the lower bearing elements. High-pressure oil is admitted into a pocket 334 by opening a manually adjusted needle valve 336 which is shown in greater detail in FIG. 13. The manually operated valve 336 can be threaded into and out of a bore to open and close a conduit 338 which communicates between the high-pressure conduit 330 and the oil pocket 334. Thus, manual operation of the needle valve 336 dictates a flow of high-pressure fluid to the pocket 334. If the valve 336 is moved to a closed position, high-pressure oil will not be admitted, but lubrication of the bearing surface will be accomplished by low-pressure oil admitted to oil grooves 340 which are formed into the surfaces of the bearing elements 304 in a manner similar to the formation of grooves 322 in the bearing elements 302. In addition to the provision of high- and low-pressure oil circulation, the bearing elements 304 are urged radially inwardly toward the cradle cylindrical surface by compression springs 342 mounted between outer surfaces of the bearings and an inner surface of the cradle housing (see FIG. 11). These springs function to maintain a bearing contact of the bearing elements 304 with side portions of the cradle. Additional bearing contact pressure tendency is provided by pistons 350 contained within cylinders 352 and reacting against the cradle housing. A chamber 354 of the cylinders 352 is in open communication with the oil pressure pocket 334, and thus, high-pressure oil can enter the chamber 354 and urge the bearing element 304 radially inwardly toward the cradle. However, excessive friction tendency is compensated by the reactive force on the bearing element from the quantity of oil which is contained under pressure in the pocket 334. Thus is obtained both the desired total stabilizing force, and the desired friction force for braking.

The side bearing elements 304 compensate for fluctuating horizontal components of external loads acting on the cradle. Such loads are a result of cutting forces acting on the cradle in operation when a gear tooth is being cut, and in normal operation, there will be fluctuating horizontal load components toward one or the other of the bearing elements 304. Once it is determined which side bearing element will carry the horizontal load of the cradle, that side bearing element is bolted fixedly to the cradle housing and its high-pressure conduit is closed by its manually operated valve 336 so that only low-pressure lubricating oil is admitted to the channels 340 of that bearing element. On the other hand, the opposing bearing element essentially floats as already described, and thus can function as a light drag brake on the cradle.

We claim:

1. In a gear cutting machine of the type having a frame and a cradle which is disposed on a horizontal axis of rotation within a cradle housing carried by said frame, the improvement in said cradle comprising balance adjustment means for adjusting the balance of said cradle after it has been assembled in a gear cutting machine, said balance adjustment means including a plurality of supports for holding weight elements, said supports being spaced around the circumference of said cradle so that said weight elements can be added or subtracted to selected supports to obtain a desired balance condition for said cradle.

2. The improvement of claim 1 wherein a plurality of pockets are formed in spaced positions about the circumference of the cradle, and wherein said supports are positionable in said pockets to receive and carry said weights.

3. The improvement of claim 2 wherein said pockets are shaped to receive a greater number of weights at a lower level of the cradle than at an upper level thereof.

4. The improvement of claim 2 wherein each of said supports comprises a rod means which can be secured into one of said pockets to receive one or more weight elements having a bore therethrough for positioning the weight element on said rod means.

5. The improvement of claim 1 wherein said balance adjustment means includes a plurality of open ended pockets extending axially into said cradle in spaced positions circumferentially about an annular face of the cradle, and including rod means which can be secured into each of said pockets for receiving and holding one or more weight elements which are formed to be carried on said rod means.